(12) United States Patent
Ma et al.

(10) Patent No.: US 11,962,929 B2
(45) Date of Patent: Apr. 16, 2024

(54) METHOD, APPARATUS, AND DEVICE FOR CONFIGURING VIDEO SPECIAL EFFECT, AND STORAGE MEDIUM

(71) Applicant: Beijing Bytedance Network Technology Co., Ltd., Beijing (CN)

(72) Inventors: Ruifeng Ma, Beijing (CN); Lin Yuan, Beijing (CN); Haozhe Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/057,579

(22) Filed: Nov. 21, 2022

(65) Prior Publication Data

US 2023/0082530 A1    Mar. 16, 2023

Related U.S. Application Data

(63) Continuation of application No. PCT/CN2021/094875, filed on May 20, 2021.

(30) Foreign Application Priority Data

May 21, 2020  (CN) .......................... 202010438279.7

(51) Int. Cl.
  *H04N 5/262* (2006.01)
  *G11B 27/02* (2006.01)
(52) U.S. Cl.
  CPC ............. *H04N 5/262* (2013.01); *G11B 27/02* (2013.01)
(58) Field of Classification Search
  None
  See application file for complete search history.

(56) References Cited

U.S. PATENT DOCUMENTS 11,082,486 B1 *  8/2021  Brevoort ............. H04L 65/1083
2007/0296734 A1  12/2007  Ekpar
(Continued)

FOREIGN PATENT DOCUMENTS

CN     102779028 A    11/2012
CN     107592474 A     1/2018
(Continued)

OTHER PUBLICATIONS

First Office Action in CN202010438279.7, dated Mar. 17, 2022, 7 pages.
(Continued)

*Primary Examiner* — Daniel T Tekle
(74) *Attorney, Agent, or Firm* — Astute IP Law Group

(57) ABSTRACT

The present disclosure provides a method, apparatus, and device for configuring a video special effect, and a storage medium, and relates to the technical field of special effect processing. The method includes: adding a first association node to a first special effect event combination in response to a first setting operation of a user; adding a second association node corresponding to the first association node to a second special effect event combination in response to a second setting operation of the user; and generating a configuration file of the video special effect according to the first special effect event combination and the second special effect event combination. The configuration file is configured to indicate that the video special effect is presented in a target video.

20 Claims, 6 Drawing Sheets

(56) References Cited

U.S. PATENT DOCUMENTS

| | | | |
|---|---|---|---|
| 2014/0267309 A1 | 9/2014 | Wilson et al. | |
| 2020/0125218 A1* | 4/2020 | Bender | H04L 51/04 |
| 2020/0302816 A1* | 9/2020 | Williams | G09B 5/06 |
| 2021/0026897 A1* | 1/2021 | Rathje | G06F 16/90332 |
| 2021/0185370 A1* | 6/2021 | Waterman | H04N 21/23109 |
| 2021/0263964 A1* | 8/2021 | Nasir | G06N 3/08 |
| 2021/0397402 A1* | 12/2021 | Ashkenazi | G06F 3/1423 |
| 2022/0059134 A1* | 2/2022 | Waterman | G06V 20/49 |
| 2022/0263877 A1* | 8/2022 | Conlin | H04N 7/152 |

FOREIGN PATENT DOCUMENTS

| | | |
|---|---|---|
| CN | 108958610 A | 12/2018 |
| CN | 109343778 A | 2/2019 |
| CN | 109960448 A | 7/2019 |
| CN | 110147231 A | 8/2019 |
| CN | 110611776 A | 12/2019 |
| CN | 110674341 A | 1/2020 |
| JP | 2017045335 A | 3/2017 |
| JP | 2019504532 A | 2/2019 |

OTHER PUBLICATIONS

International Search Report and Written Opinion in PCT/CN2021/094875, dated Aug. 4, 2021, 10 pages.
Santoni et.al., "LevelMerge: Collaborative Game Level Editing by Merging Labeled Graphs", IEEE Computer Graphics and Applications, vol. 38, Issue: 4, Mar. 2, 2016, 8 pages.

* cited by examiner

METHOD, APPARATUS, AND DEVICE FOR CONFIGURING VIDEO SPECIAL EFFECT, AND STORAGE MEDIUM

This application is a continuation of International Application No. PCT/CN2021/094875 filed on May 20, 2021, which claims the priority to and benefits of Chinese Patent Application No. 202010438279.7, filed on May 21, 2020. All the aforementioned patent applications are hereby incorporated by reference in their entireties.

TECHNICAL FIELD

Embodiments of the present disclosure relate to a technical field of special effect processing, and more particularly, a method, apparatus, and device for configuring a video special effect, and a storage medium.

BACKGROUND

In order to enhance interactivity of a video, trigger events (including expression actions and body actions) and corresponding triggered special effect elements are set in a special effect event combination of a special effect production tool.

SUMMARY

The content of the present disclosure is provided so as to introduce the concept in a brief form, which will be described in detail in specific implementations below. The content of the present disclosure is not intended to identify key or necessary features of the claimed technical solution, nor is it intended to be used to limit the scope of the claimed technical solution required.

In a first aspect, the embodiments of the present disclosure provide a method for configuring a video special effect, which includes steps of:
  adding a first association node to a first special effect event combination in response to a first setting operation of a user;
  adding a second association node corresponding to the first association node to a second special effect event combination in response to a second setting operation of the user; and
  generating a configuration file of the video special effect according to the first special effect event combination and the second special effect event combination.

The configuration file is configured to indicate that the video special effect is presented in a target video; and in a presentation process of the video special effect, execution of the second special effect event combination is triggered from the second association node in a case where the first special effect event combination is executed to the first association node.

In a second aspect, the embodiments of the present disclosure provide an apparatus for configuring a video special effect, including:
  a first setting module, which is configured to add a first association node to a first special effect event combination in response to a first setting operation of the user;
  a second setting module, which is configured to add a second association node corresponding to the first association node to a second special effect event combination in response to a second setting operation of the user; and
  a configuration module, which is configured to generate a configuration file of the video special effect according to the first special effect event combination and the second special effect event combination.

The configuration file is configured to indicate that the video special effect is presented in a target video; and in a presentation process of the video special effect, execution of the second special effect event combination is triggered from the second association node in a case where the first special effect event combination is executed to the first association node.

In a third aspect, the embodiments of the present disclosure provide a computer device, including a memory, a processor, and a computer program stored in the memory and being capable of running in the processor. When the processor executes the program, the steps of the method for configuring a video special effect as described in any embodiment in the first aspect are implemented.

In a fourth aspect, the embodiments of the present disclosure provide a storage medium including computer-executable instructions, and the computer-executable instructions, when executed by a computer processor, is configured to execute the steps of the method for configuring a video special effect as described in any embodiment in the first aspect.

Additional aspects and advantages of the present disclosure will be given in part in the following description, which will become apparent from the following description or learned from the practice of the present disclosure.

BRIEF DESCRIPTION OF THE DRAWINGS

The above and other features, advantages and aspects of the various embodiments of the present disclosure will become more apparent in combination with the drawings and with reference to the following specific implementations. Throughout the drawings, the same or similar reference numerals represent the same or similar elements. It should be understood that the drawings are schematic, and the components and elements are not necessarily drawn to scale.

DETAILED DESCRIPTION

Figure 1:
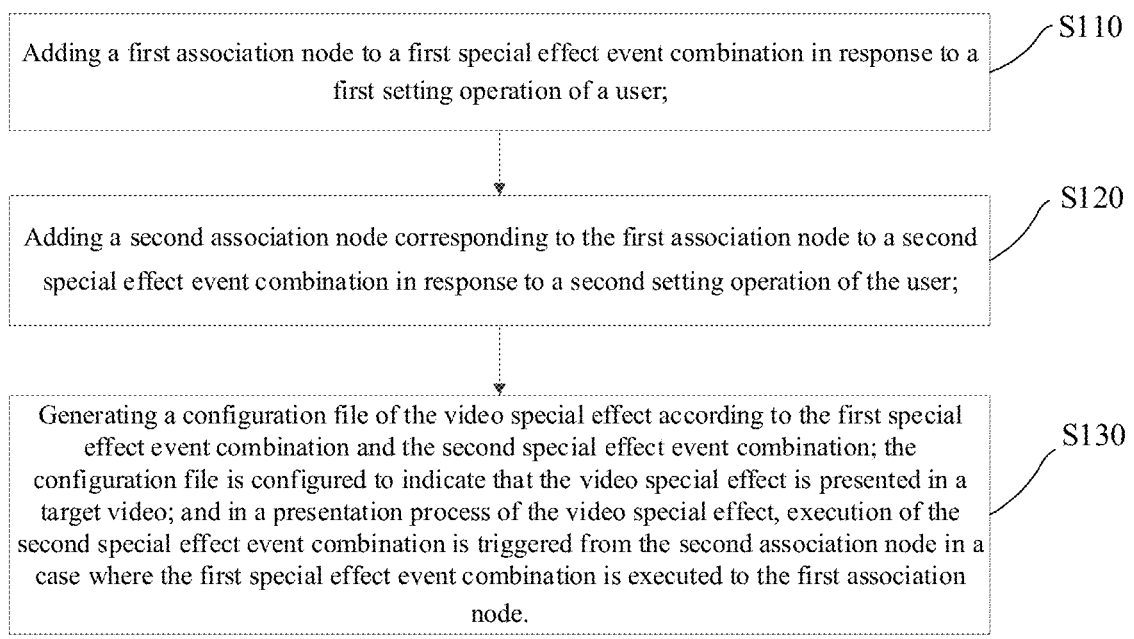
FIG. 1 is a schematic flowchart of a method for configuring a video special effect provided by at least one embodiment of the present disclosure.

Embodiments of the present disclosure will be described in more detail below with reference to the drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit these devices, modules or units to be different devices, modules or units, nor to limit the interdependence relationship or the order of functions performed by these devices, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

The names of messages or information exchanged between multiple devices in the embodiments of the present disclosure are only for illustrative purposes, and are not intended to limit the scope of these messages or information.

Generally, there is no correlation between all special effect event combinations, from which, there is also no correlation between trigger execution of its trigger events. Thus, production of the video special effect is limited, which cannot further improve the video special effect, and affects the enthusiasm of a user to record a video. The method, apparatus and device for configuring a video special effect and the storage medium provided by the present disclosure are intended to solve the above technical problems in a prior art.

According to the method, apparatus and device for configuring a video special effect and the storage medium in the embodiments of the present disclosure, a first association node and a second association node are connected by using a send operation and a receive operation respectively added for a same notification at the first association node and the second association node, so that the first special effect event combination and the second special effect event combination where the first association node and the second association node are respectively located are associated, so that the video special effect presented is more diversified according to an association relationship of different special effect event combinations. It is beneficial to expanding production space of the video special effect, and also contributes to the enthusiasm of the user to record the video.

The technical solutions of the present disclosure and how the technical solutions of the present disclosure solve the above-mentioned technical problems are described in detail below with specific embodiments. The following specific embodiments may be combined with each other, and the same or similar concepts or processes may not be repeated in certain embodiments. The embodiments of the present disclosure will be described below in combination with the drawings.

The method for configuring a video special effect provided by the embodiments of the present disclosure can be applied to a terminal of video special effect development.

Figure 2:
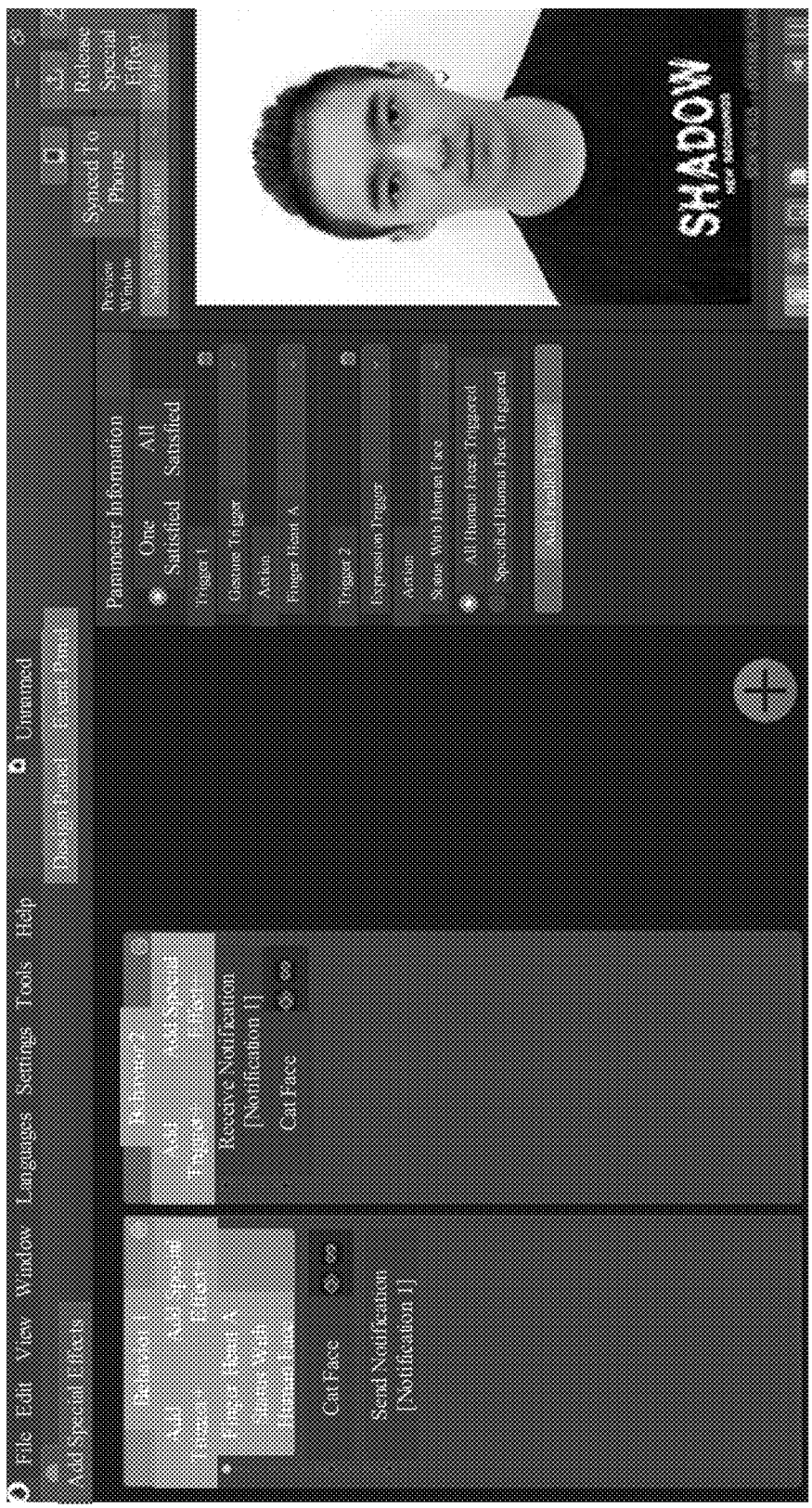
FIG. 2 is a schematic diagram of a production interface of a method for configuring a video special effect provided by at least one embodiment of the present disclosure.

Referring to FIG. 1 and FIG. 2, FIG. 1 is a schematic flowchart of a method for configuring a video special effect provided by at least one embodiment of the present disclosure, and FIG. 2 is a schematic diagram of a production interface of a method for configuring a video special effect provided by at least one embodiment of the present disclosure.

The method for configuring a video special effect provided by the embodiments of the present disclosure may be applied to a terminal of video special effect design, and the method may include:

step S110: adding a first association node to a first special effect event combination in response to a first setting operation of a user.

On an operation interface of a special effect production tool, a first special effect event combination and a second special effect event combination are added in response to an operation of the user. As illustrated in FIG. 2, an editing part includes boxes named "Behavior 1" and "Behavior 2", where "Behavior 1" is the first special effect event combination and "Behavior 2" is the second special effect event combination.

According to an instruction of a first setting operation sent by the user in the first special effect event combination named "Behavior 1", the special effect production tool runs its terminal to add the first association node to the first special effect event combination named "Behavior 1" in response to the first setting operation. Moreover, a corresponding execution notification, such as [Notification 1] as illustrated in FIG. 2, is set corresponding to the first association node.

In FIG. 2, the first association node is "Send Notification [Notification 1]". The Send Notification [Notification 1] is set to be a send operation that executes [Notification 1] in the first special effect event combination named "Behavior 1".

Step S120: adding a second association node corresponding to the first association node to a second special effect event combination in response to a second setting operation of the user.

For the second special effect event combination named "Behavior 2", the user clicks a control of "Add Trigger+" in the second special effect event combination named "Behavior 2", and sends an instruction of a second setting operation, and the terminal adds the second association node in the second special effect event combination named "Behavior 2" in response to the second setting operation. Moreover, a "Receive Notification [Notification 1]" corresponding to the "Send Notification [Notification 1]" in step S110 is set corresponding to the second association node. The "Send Notification [Notification 1]" and the "Receive Notification [Notification 1]" make the first association node with the second association node connected by selecting [Notification 1] when the operation is executed. After execution of the "Send Notification [Notification 1]" of the first association node, according to a connection relationship between the two association nodes, the "Receive Notification [Notification 1]" of the second association node is executed.

For setting of the "Receive Notification [Notification 1]", setting of the corresponding video special effect is added. According to the setting, execution of the corresponding video special effect can be triggered with the "Receive Notification [Notification 1]" as a trigger condition, in the second special effect event combination.

Further, the second association node is provided with a corresponding special effect element. In a presentation process of the video special effect, the corresponding special effect element of the second association node is triggered in a case where the second special effect event combination is executed to the second association node.

By the connection of the [Notification 1], execution of the second association node of the second special effect event combination is triggered after the first special effect event combination is executed to the first association node, and the special effect element corresponding to the second association node can be triggered with the "Receive Notification [Notification 1]" in the second association node as the trigger condition. As illustrated in FIG. 2, a video special effect of "Cat Face" is added according to the second association node.

Step S130: generating a configuration file of the video special effect according to the first special effect event combination and the second special effect event combination.

By adding the first association node and the second association node in the first special effect event combination and the second special effect event combination, respectively, in step S110 and step S120, a string corresponding to the first special effect event combination and the second special effect event combination is formed, and the configuration file of the video special effect is generated according to the string.

The configuration file is configured to indicate that the video special effect is presented in a target video. In the presentation process of the video special effect, execution of presentation of the video special effect of the second special effect event combination is triggered from the second association node in a case where the first special effect event combination is executed to the first association node.

In the present embodiment, the configuration file may be applied to an application that records the target video. According to a user's special effect need for the target video, a configuration file with a specific video special effect or video special effect combination is selected from the application to perform video special effect processing on the target video acquired by the application.

In the above-mentioned embodiment, the first association node and the second association node are connected by using a send operation and a receive operation respectively added for a same notification at the first association node and the second association node, so that the first special effect event combination and the second special effect event combination where the first association node and the second association node are respectively located are associated, so that the video special effect presented is more diversified according to an association relationship of different special effect event combinations. It is beneficial to expanding the production space of the video special effect, and also contributes to the enthusiasm of the user to record the video.

In the present embodiment, the first association node is provided with a corresponding trigger event. In the presentation process of the video special effect, in the case where the first special effect event combination is executed to the first association node, execution of the second special effect event combination is triggered from the second association node if the corresponding trigger event of the first association node is satisfied.

In the present embodiment, the above-mentioned trigger event is a recognition element or detection element of a trigger action or trigger operation set by the user according to a trigger need of triggering the video special effect. If the trigger event is the recognition element, such as video images including expression actions, body actions and the like. In the recognition element, the corresponding trigger event may be formed by acquiring an image of the expression action or body action of the user. If a face model without a corresponding expression action is input into a terminal, a corresponding location region restriction is made for facial features without the corresponding expression action in the face model. If it is acquired that a region where a corresponding organ is located changes, it is determined that the acquired user has made the corresponding expression action. For this expression action of "Open Mouth", if a region where both lips are located exceeds a region where the mouth is closed, it is recognized that the user has made the expression action of "Open Mouth" according to a coordinate change of the region where both lips are located.

The trigger event may also be the detection element, such as shooting video, build-in video special effect or ending sticker exposure or the like, as for the shooting video, a shoot instruction of a video or a login instruction of a corresponding video shoot application is prestored as the trigger event.

From the target video, the corresponding expression action or body action of the video image is acquired, or an operation instruction of the terminal of the target video is acquired, and when the corresponding trigger event of the first association node is satisfied, the first association node is triggered with the trigger event as the trigger condition, and the second special effect event combination is executed according to the connection relationship between the first association node and the second association node, starting with the second association node.

Based on the above-mentioned embodiments, the first special effect event combination includes an association node set, and the first association node is added to the association node set.

The method for configuring a video special effect further includes:
  adding a third association node to the association node set in response to a third setting operation of the user, the third association node being provided with a corresponding trigger event;
  and adding a fourth association node corresponding to the third association node to a third special effect event combination in response to a fourth setting operation of the user.

The configuration file is further configured to be generated according to the third special effect event combination. In the presentation process of the video special effect, in a case where the first special effect event combination is executed to the association node set, execution of the third special effect event combination is triggered from the fourth association node if the corresponding trigger event of the third association node is satisfied.

In the embodiment, the association node set is set in the first special effect event combination, the association node set at least includes the first association node and the third association node, and is provided with respective trigger events. In a process of acquiring the target video, once the corresponding trigger event is first triggered by the target video, execution of the corresponding first association node is triggered.

Corresponding to the third association node, the fourth association node is added to the third special effect event combination. A connection relationship is established between the third association node and the fourth association node by using a send operation and a receive operation respectively added for a same notification at the third association node and the fourth association node, and the first special effect event combination and the third special effect event combination are associated.

In the present embodiment, the configuration file further includes a part corresponding to the third special effect event combination, and is generated according to the third special effect event combination with the first special effect event combination and the second special effect event combination. In the presentation process of the video special effect, when the first special effect event combination is executed to the association node set, and a trigger event satisfying the third special effect event combination is obtained, execution of the third special effect event combination is triggered from the fourth association node according to the association relationship between the first special effect event combination and the third special effect event combination.

In the present embodiment, the first association node and the third association node are set in a same association node set of the first special effect event combination, and the first special effect event combination can be associated with a plurality of different special effect event combinations according to the connection between the first association node and the second association node, and the connection between the third association node and the fourth association node, so that trigger of the corresponding video special effects are increased according to different trigger events, further broadening a configuration range of the configuration file for the video special effect, thus enriching the video special effect of the target video.

Figure 3:
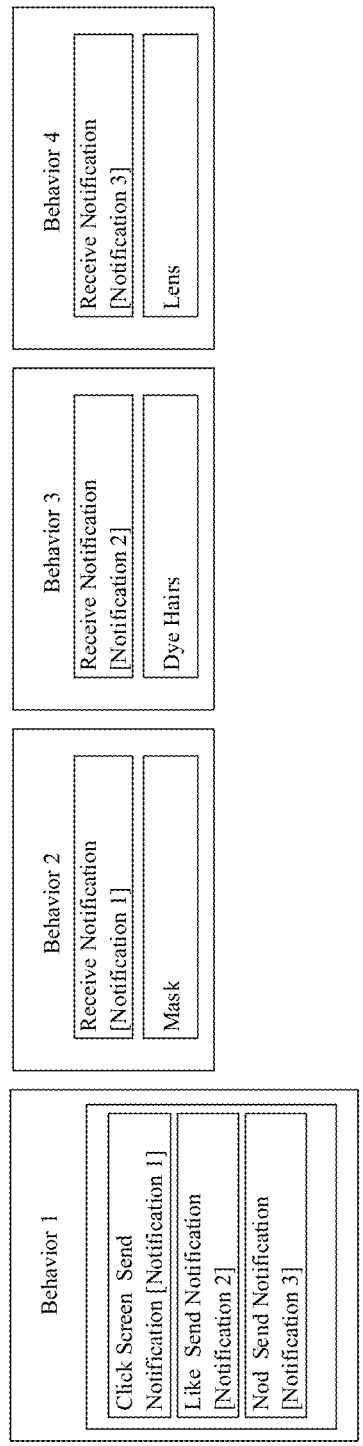
FIG. 3 is a schematic diagram of a production interface of a method for configuring a video special effect provided by at least one embodiment of the present disclosure.

Referring to FIG. 3, FIG. 3 is a schematic diagram of a production interface of a method for configuring a video special effect provided by at least one embodiment of the present disclosure.

As illustrated in FIG. 3, a schematic diagram of the current production interface includes four special effect event combinations named "Behavior 1", "Behavior 2", "Behavior 3" and "Behavior 4", respectively. The special effect event combination "Behavior 1" includes an association node set. The association node set includes three association nodes, and trigger events of the three association nodes are Click Screen, Like and Nod, respectively. According to a positional arrangement of the association nodes, the trigger event of Click Screen may be defined as the first association node, and the trigger events such as Like and Nod are both defined as the third association node. Correspondingly, a special effect event combination named "Behavior 1" is the first special effect event combination, a special effect event combination named "Behavior 2" is the second special effect event combination, a special effect event combination named "Behavior 3" is the third special effect event combination, and a special effect event combination named "Behavior 4" is the fourth special effect event combination.

The second special effect event combination "Behavior 2" includes the second association node corresponding to the first association node, the third special effect event combination "Behavior 3" includes the fourth association node corresponding to the third association node with the trigger event of "Like", and the fourth special effect event combination "Behavior 4" includes the fourth association node corresponding to the third association node with the trigger event of "Nod".

The configuration file is generated according to the four special effect event combinations. In the presentation process of the video special effect, an execution principle of presentation of the video special effect is executed by using this configuration file, and it is illustrated with triggering the trigger event of "Nod" in the first special effect event combination "Behavior 1" as an example:

In the presentation process of the video special effect, the fourth special effect event combination "Behavior 4" is executed from the fourth association node in the fourth special effect event combination "Behavior 4" when the trigger event is acquired, and the trigger event of "Nod" is satisfied, in the case where the first special effect event combination is executed to the association node set.

On this basis, in the presentation process of the video special effect, the corresponding trigger event of only one association node in the association node set is satisfied.

In the association node set as illustrated in FIG. 3, a corresponding operation of the Send Notification [Notification 1] is executed according to the first association node if the first association node with the trigger event of "Click Screen" is satisfied. In this case, the third association node with the trigger event of "Like" and the third association node with the trigger event of "Nod" are not satisfied.

On this basis, in the presentation process of the video special effect, in the case where the first special effect event combination is executed to the association node set, execution of the third special effect event combination is rejected to be triggered from the fourth association node if the corresponding trigger event of the third association node is satisfied again after the corresponding trigger event of the first association node is satisfied and the execution of the second special effect event combination is triggered from the second association node.

It is illustrated further with that the first association node with the trigger event of "Click Screen" is satisfied as an example. If the first association node with the trigger event of "Click Screen" is satisfied, the execution of the second special effect event combination "Behavior 2" is triggered starting with the Receive Notification [Notification 1]. After this, if the third association node with the trigger event of "Like" and the third association node with the trigger event of "Nod" are satisfied, triggering of the third special effect event combination "Behavior 3" starting with a Receive Notification [Notification 2] is rejected, and triggering of the fourth special effect event combination "Behavior 4" starting with a Receive Notification [Notification 3] is rejected.

Figure 4:
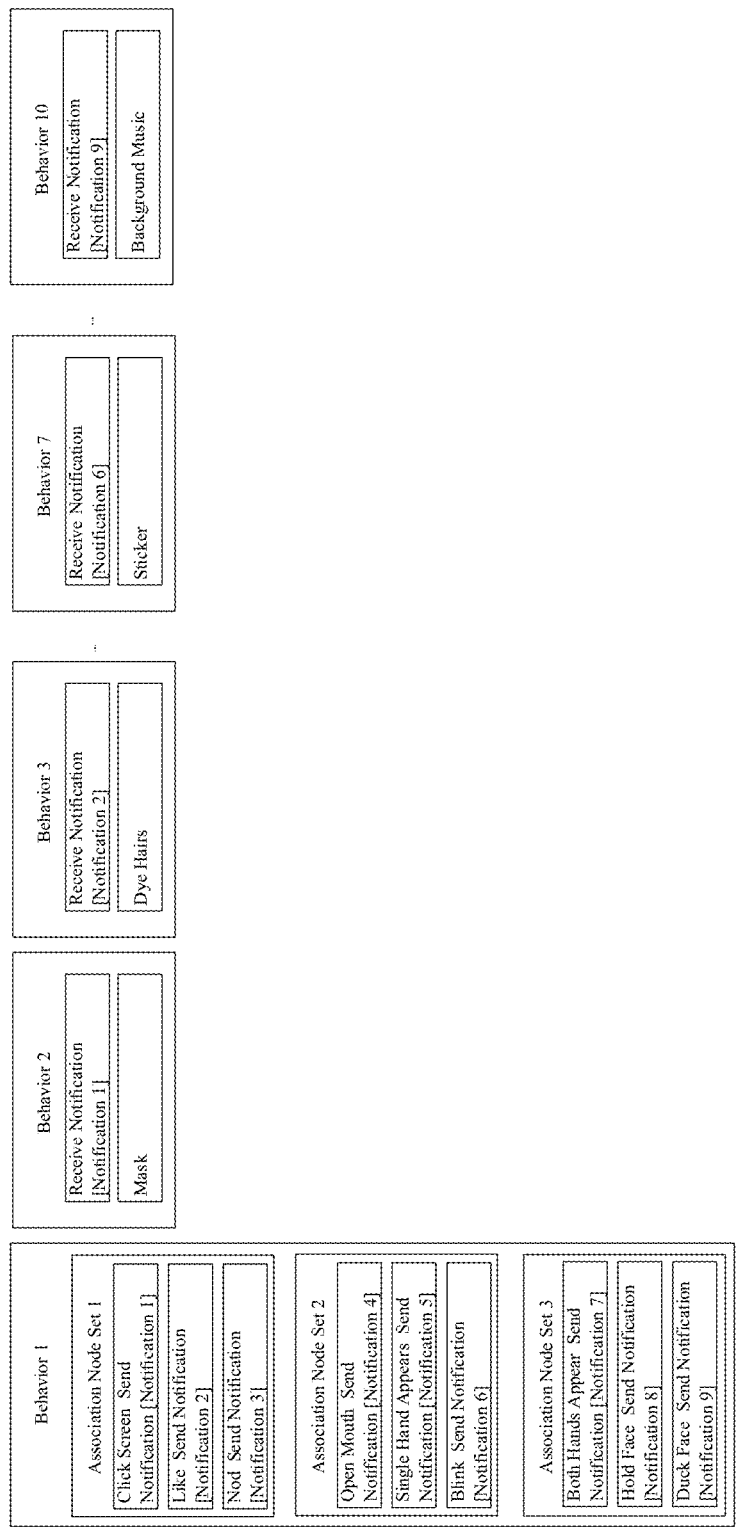
FIG. 4 is a schematic diagram of a production interface of a method for configuring a video special effect provided by at least one embodiment of the present disclosure.

Referring to FIG. 4, FIG. 4 is a schematic diagram of a production interface of a method for configuring a video special effect provided by at least one embodiment of the present disclosure.

In the present embodiment, the first special effect event combination including "Behavior 1" includes three association node sets. In a process of triggering each association node set to present the video special effect, execution is performed according to an arrangement order of the association node sets.

The method for configuring a video special effect provided by the embodiment of the present disclosure further includes:

adding a delay node to the first special effect event combination or the second special effect event combination in response to a delay setting operation of the user;

and according to set time of the delay node, delaying execution of a corresponding trigger event of a next node of the delay node according to an execution order.

Figure 5:
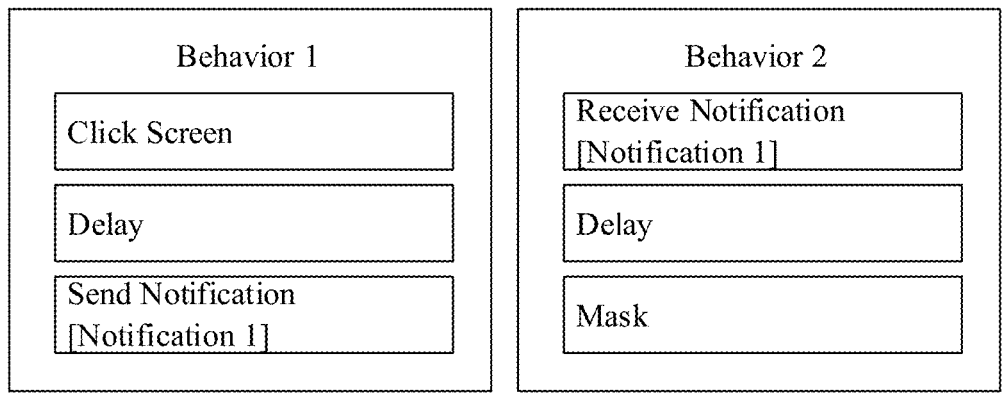
FIG. 5 is a schematic diagram of a production interface of a method for configuring a video special effect provided by at least one embodiment of the present disclosure.

Referring to FIG. 5, FIG. 5 is a schematic diagram of a production interface of a method for configuring a video special effect provided by at least one embodiment of the present disclosure.

In the present embodiment, the delay node is set before the first association node of the first special effect event combination. After the trigger event of "Click Screen" is satisfied, executing of execution of the event of the Send Notification [Notification 1] in the first association node is delayed according to the set time of the delay node. If the delay node is set after the second association node of the second special effect event combination, after the event of Receive Notification [Notification 1] in the second association node is executed, triggering of a video special effect of "Mask" is delayed according to the set time of the delay node.

In the present embodiment, delay setting information may be set according to the execution of the Send and Receive Notifications, which makes special effect presentation of the configuration file of the video special effect generated by triggering of the trigger event more diversified.

Figure 6:
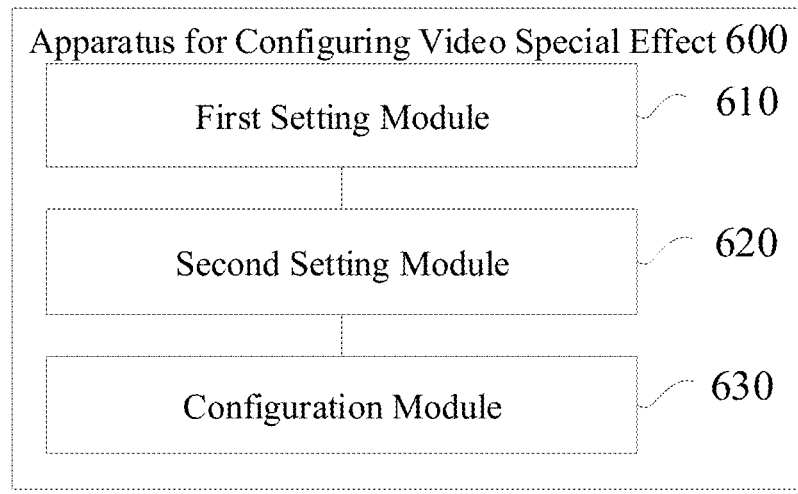
FIG. 6 is a schematic diagram of a structure of an apparatus for configuring a video special effect provided by at least one embodiment of the present disclosure.

Referring to FIG. 6, FIG. 6 is a schematic diagram of a structure of an apparatus for configuring a video special effect provided by at least one embodiment of the present disclosure.

The present disclosure provides an apparatus for configuring a video special effect, as illustrated in FIG. 6, the apparatus 600 for configuring a video special effect may include:

a first setting module 610, which is configured to add a first association node to a first special effect event combination in response to a first setting operation of the user;

a second setting module 620, which is configured to add a second association node corresponding to the first association node to a second special effect event combination in response to a second setting operation of the user;

and a configuration module 630, which is configured to generate a configuration file of the video special effect according to the first special effect event combination and the second special effect event combination.

The configuration file is configured to indicate that the video special effect is presented in the target video. In the presentation process of the video special effect, execution of the second special effect event combination is triggered from the second association node in a case where the first special effect event combination is executed to the first association node.

The embodiments of the present disclosure provide a possible implementation, in a case where conditions that the association node set is included in the first special effect event combination and the first association node is added to the association node set are satisfied, the apparatus 600 for configuring a video special effect further includes:

a third setting module, which is configured to add a third association node to an association node set in response to a third setting operation of the user, and the third association node is provided with a corresponding trigger event;

and a fourth setting module, which is configured to add a fourth association node corresponding to the third association node to a third special effect event combination in response to a fourth setting operation of the user.

The configuration file is further configured to be generated according to the third special effect event combination. In the presentation process of the video special effect, in the case where the first special effect event combination is executed to the association node set, execution of the third special effect event combination is triggered from the fourth association node if the corresponding trigger event of the third association node is satisfied.

The embodiments of the present disclosure provide another possible implementation. For the third setting module, in the presentation process of the video special effect, the corresponding trigger event of only one association node in the association node set is satisfied.

According to the above-mentioned apparatus 600 for configuring a video special effect in the solution of the embodiment of the present disclosure, the first association node and the second association node are connected by using a send operation and a receive operation respectively added for a same notification at the first association node and the second association node, so that the first special effect event combination and the second special effect event combination where the first association node and the second association node are respectively located are associated, so that the video special effect presented is more diversified according to an association relationship of different special effect event combinations. It is beneficial to expanding production space of the video special effect, and also contributes to the enthusiasm of the user to record the video.

Figure 7:
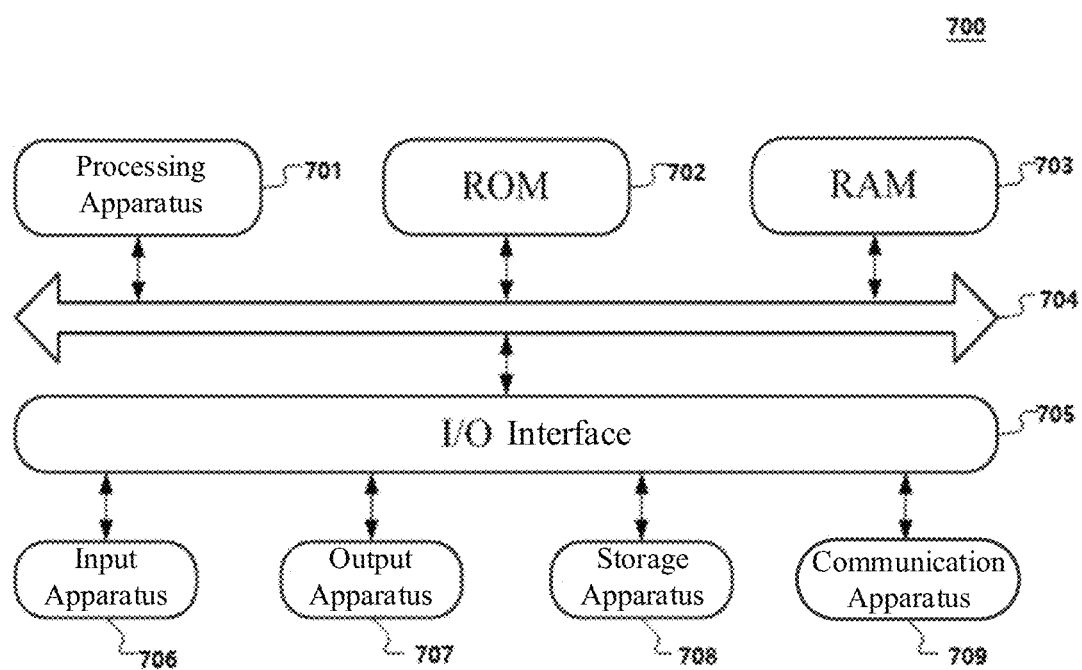
FIG. 7 is a schematic diagram of a structure of an electronic device for configuring a video special effect provided by at least one embodiment of the present disclosure.

Referring to FIG. 7, FIG. 7 is a schematic diagram of a structure of an electronic device for configuring a video special effect provided by at least one embodiment of the present disclosure, which illustrates a schematic diagram of a structure suitable for implementing an electronic device 700 of the embodiments of the present disclosure. The electronic device 700 in the embodiments of the present disclosure may include, but not limited to, mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 7 is merely an example, and should not pose any limitation to the functions and the range of use of the embodiments of the present disclosure.

The electronic device 700 includes a memory and a processor, the processor herein may be called a processing apparatus 701 below, and the memory may include at least one of a read-only memory (ROM) 702, a random-access memory (RAM) 703, and a storage apparatus 708 below, which is specifically illustrated below.

As illustrated in FIG. 7, the electronic device 700 may include a processing apparatus 701 (e.g., a central processing unit, a graphics processing unit, etc.), which can perform various suitable actions and processing according to a program stored in a read-only memory (ROM) 702 or a program loaded from a storage apparatus 708 into a random-access memory (RAM) 703. The RAM 703 further stores various programs and data required for operations of the electronic device 700. The processing apparatus 701, the ROM 702, and the RAM 703 are interconnected by means of a bus 704. An input/output (I/O) interface 705 is also connected to the bus 704.

Usually, the following apparatus may be connected to the I/O interface 705: an input apparatus 706 including, for example, a touch screen, a touch pad, a keyboard, a mouse, a camera, a microphone, an accelerometer, a gyroscope, or the like; an output apparatus 707 including, for example, a liquid crystal display (LCD), a loudspeaker, a vibrator, or the like; a storage apparatus 708 including, for example, a magnetic tape, a hard disk, or the like; and a communication apparatus 709. The communication apparatus 709 may allow the electronic device 700 to be in wireless or wired communication with other devices to exchange data. While FIG. 7 illustrates the electronic device 700 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 709 and installed, or may be installed from the storage apparatus 708, or may be installed from the ROM 702. When the computer program is executed by the processing apparatus 701, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) or the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: add the first association node to the first special effect event combination in response to the first setting operation of the user; add the second association node corresponding to the first association node to the second special effect event combination in response to the second setting operation of the user; and generate the configuration file of the video special effect according to the first special effect event combination and the second special effect event combination. The configuration file is configured to indicate that the video special effect is presented in the target video. In the presentation process of the video special effect, the execution of the second special effect event combination is triggered from the second association node in a case where the first special effect event combination is executed to the first association node.

The computer program codes for performing the operations of the present disclosure may be written in one or more programming languages or a combination thereof. The above-mentioned programming languages include object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances, for example, the configuration module may also be described as "a unit that forms the configuration file according to association of the special effect event combinations".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

One or more embodiments of the present disclosure provide a method for configuring a video special effect, which includes steps of:
   adding a first association node to a first special effect event combination in response to a first setting operation of the user;
   adding a second association node corresponding to the first association node to a second special effect event combination in response to a second setting operation of the user;
   and generating a configuration file of the video special effect according to the first special effect event combination and the second special effect event combination.

The configuration file is configured to indicate that the video special effect is presented in the target video. In the presentation process of the video special effect, execution of the second special effect event combination is triggered from the second association node in a case where the first special effect event combination is executed to the first association node.

One or more embodiments of the present disclosure provide a method for configuring a video special effect:
   the first association node is provided with the corresponding trigger event; and in the presentation process of the video special effect, in the case where the first special effect event combination is executed to the first association node, execution of the second special effect event combination is triggered from the second association node if the corresponding trigger event of the first association node is satisfied.

One or more embodiments of the present disclosure provide a method for configuring a video special effect:
   the first special effect event combination includes the association node set, and the first association node is added to the association node set;
   the method further includes:
   adding the third association node to the association node set in response to the third setting operation of the user, the third association node being provided with the corresponding trigger event;
   and adding the fourth association node corresponding to the third association node to the third special effect event combination in response to the fourth setting operation of the user.

The configuration file is further configured to be generated according to the third special effect event combination. In the presentation process of the video special effect, in a case where the first special effect event combination is executed to the association node set, execution of the third special effect event combination is triggered from the fourth association node if the corresponding trigger event of the third association node is satisfied.

One or more embodiments of the present disclosure provide a method for configuring a video special effect:
   in the presentation process of the video special effect, the corresponding trigger event of only one association node in the association node set is satisfied.

One or more embodiments of the present disclosure provide a method for configuring a video special effect:
   in the presentation process of the video special effect, in the case where the first special effect event combination is executed to the association node set, execution of the third special effect event combination is rejected to be triggered from the fourth association node if the corresponding trigger event of the third association node is satisfied again after the corresponding trigger event of the first association node is satisfied and the execution of the second special effect event combination is triggered from the second association node.

One or more embodiments of the present disclosure provide a method for configuring a video special effect, further including:
   adding the first delay node to the first special effect event combination or the second special effect event combination in response to the delay setting operation of the user;
   and according to set time of the delay node, delaying execution of a corresponding trigger event of a next node of the delay node according to an execution order.

One or more embodiments of the present disclosure provide a method for configuring a video special effect:
   the second association node is provided with a corresponding special effect element; and in the presentation process of the video special effect, the corresponding special effect element of the second association node is triggered in a case where the second special effect event combination is executed to the second association node.

One or more embodiments of the present disclosure provide an apparatus for configuring a video special effect, which includes:

a first setting module, which is configured to add a first association node to a first special effect event combination in response to a first setting operation of a user;

a second setting module, which is configured to add a second association node corresponding to the first association node to a second special effect event combination in response to a second setting operation of the user;

and a configuration module, which is configured to generate a configuration file of the video special effect according to the first special effect event combination and the second special effect event combination.

The configuration file is configured to indicate that the video special effect is presented in a target video; and in a presentation process of the video special effect, execution of the second special effect event combination is triggered from the second association node in a case where the first special effect event combination is executed to the first association node.

One or more embodiments of the present disclosure provide an apparatus for configuring a video special effect, in a case where the conditions that the first special effect event combination includes the association node set, and the first association node is added to the association node set are satisfied, the apparatus for configuring a video special effect further includes:

a third setting module, which is configured to add a third association node to an association node set in response to a third setting operation of the user, and the third association node is provided with a corresponding trigger event;

and a fourth setting module, which is configured to add a fourth association node corresponding to the third association node to a third special effect event combination in response to a fourth setting operation of the user.

The configuration file is further configured to be generated according to the third special effect event combination. In the presentation process of the video special effect, in a case where the first special effect event combination is executed to the association node set, execution of the third special effect event combination is triggered from the fourth association node if the corresponding trigger event of the third association node is satisfied.

One or more embodiments of the present disclosure provide an apparatus for configuring a video special effect: for the third setting module, in the presentation process of the video special effect, the corresponding trigger event of only one association node in the association node set is satisfied.

One or more embodiments of the present disclosure provide a computer device, including a memory, a processor, and a computer program stored in the memory and being capable of running in the processor, and the processor, when executing the computer program, implements steps of the method for configuring a video special effect in any embodiment above.

One or more embodiments of the present disclosure provide a storage medium including computer-executable instructions, and the computer-executable instructions, when executed by a computer processor, is configured to execute the steps of the method for configuring a video special effect in any embodiment above.

The above descriptions are merely optional embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

The invention claimed is:

1. A method for configuring a video special effect, comprising:
   adding a first association node to a first special effect event combination in response to a first setting operation of a user;
   adding a second association node corresponding to the first association node to a second special effect event combination in response to a second setting operation of the user, wherein an operation set at the first associated node and an operation set at the second associated node are for a same notification; and
   generating a configuration file of the video special effect according to the first special effect event combination and the second special effect event combination,
   wherein the configuration file is configured to indicate that the video special effect is presented in a target video; and
   in a presentation process of the video special effect, execution of the second special effect event combination is triggered from the second association node in a case where the first special effect event combination is executed to the first association node.

2. The method for configuring a video special effect according to claim 1, wherein the first association node is provided with a corresponding trigger event; and
   in the presentation process of the video special effect, in the case where the first special effect event combination is executed to the first association node, execution of the second special effect event combination is triggered from the second association node if the corresponding trigger event of the first association node is satisfied.

3. The method for configuring a video special effect according to claim 2, wherein the first special effect event combination comprises an association node set, and the first association node is added to the association node set;

the method further comprises:
adding a third association node to the association node set in response to a third setting operation of the user, the third association node being provided with a corresponding trigger event; and
adding a fourth association node corresponding to the third association node to a third special effect event combination in response to a fourth setting operation of the user,
wherein the configuration file is further configured to be generated according to the third special effect event combination; and
in the presentation process of the video special effect, in a case where the first special effect event combination is executed to the association node set, execution of the third special effect event combination is triggered from the fourth association node if the corresponding trigger event of the third association node is satisfied.

4. The method for configuring a video special effect according to claim 3, wherein in the presentation process of the video special effect, a corresponding trigger event of only one association node in the association node set is satisfied.

5. The method for configuring a video special effect according to claim 4, wherein in the presentation process of the video special effect, in the case where the first special effect event combination is executed to the association node set, execution of the third special effect event combination is rejected to be triggered from the fourth association node if the corresponding trigger event of the third association node is satisfied again after the corresponding trigger event of the first association node is satisfied and the execution of the second special effect event combination is triggered from the second association node.

6. The method for configuring a video special effect according to claim 2, further comprising:
adding a delay node to the first special effect event combination or the second special effect event combination in response to a delay setting operation of the user; and
according to set time of the delay node, delaying execution of a corresponding trigger event of a next node of the delay node according to an execution order.

7. The method for configuring a video special effect according to claim 3, further comprising:
adding a delay node to the first special effect event combination or the second special effect event combination in response to a delay setting operation of the user; and
according to set time of the delay node, delaying execution of a corresponding trigger event of a next node of the delay node according to an execution order.

8. The method for configuring a video special effect according to claim 4, further comprising:
adding a delay node to the first special effect event combination or the second special effect event combination in response to a delay setting operation of the user; and
according to set time of the delay node, delaying execution of a corresponding trigger event of a next node of the delay node according to an execution order.

9. The method for configuring a video special effect according to claim 5, further comprising:
adding a delay node to the first special effect event combination or the second special effect event combination in response to a delay setting operation of the user; and
according to set time of the delay node, delaying execution of a corresponding trigger event of a next node of the delay node according to an execution order.

10. The method for configuring a video special effect according to claim 9,
wherein the second association node is provided with a corresponding special effect element; and
in the presentation process of the video special effect, the corresponding special effect element of the second association node is triggered in a case where the second special effect event combination is executed to the second association node.

11. The method for configuring a video special effect according to claim 1, further comprising:
adding a delay node to the first special effect event combination or the second special effect event combination in response to a delay setting operation of the user; and
according to set time of the delay node, delaying execution of a corresponding trigger event of a next node of the delay node according to an execution order.

12. The method for configuring a video special effect according to claim 1,
wherein the second association node is provided with a corresponding special effect element; and
in the presentation process of the video special effect, the corresponding special effect element of the second association node is triggered in a case where the second special effect event combination is executed to the second association node.

13. An apparatus for configuring a video special effect, comprising:
a first setting module, configured to add a first association node to a first special effect event combination in response to a first setting operation of a user;
a second setting module, configured to add a second association node corresponding to the first association node to a second special effect event combination in response to a second setting operation of the user, wherein an operation set at the first associated node and an operation set at the second associated node are for a same notification; and
a configuration module, configured to generate a configuration file of the video special effect according to the first special effect event combination and the second special effect event combination,
wherein the configuration file is configured to indicate that the video special effect is presented in a target video; and
in a presentation process of the video special effect, execution of the second special effect event combination is triggered from the second association node in a case where the first special effect event combination is executed to the first association node.

14. A computer device, comprising a memory, a processor, and a computer program stored in the memory and being capable of running in the processor, wherein the processor, when executing the computer program, implements steps of the method for configuring a video special effect according to claim 1.

15. A computer device, comprising a memory, a processor, and a computer program stored in the memory and being capable of running in the processor, wherein the processor, when executing the computer program, implements steps of the method for configuring a video special effect according to claim 5.

16. A computer device, comprising a memory, a processor, and a computer program stored in the memory and being capable of running in the processor, wherein the processor, when executing the computer program, implements steps of the method for configuring a video special effect according to claim 9.

17. A computer device, comprising a memory, a processor, and a computer program stored in the memory and being capable of running in the processor, wherein the processor, when executing the computer program, implements steps of the method for configuring a video special effect according to claim 10.

18. A non-transitory storage medium comprising computer-executable instructions, wherein the computer-executable instructions, when executed by a computer processor, is configured to execute steps of the method for configuring a video special effect according to claim 1.

19. A non-transitory storage medium comprising computer-executable instructions, wherein the computer-executable instructions, when executed by a computer processor, is configured to execute steps of the method for configuring a video special effect according to claim 9.

20. A non-transitory storage medium comprising computer-executable instructions, wherein the computer-executable instructions, when executed by a computer processor, is configured to execute steps of the method for configuring a video special effect according to claim 10.

* * * * *